United States Patent [19]

Tsukiji et al.

[11] Patent Number: 5,066,130
[45] Date of Patent: Nov. 19, 1991

[54] DISPLACEMENT MEASURING APPARATUS

[75] Inventors: Masaaki Tsukiji, Tokyo; Tetsuharu Nishimura, Kawasaki; Koh Ishizuka, Urawa; Satoshi Ishii, Tokyo; Yoichi Kubota, Kawasaki, all of Japan

[73] Assignee: Canon Kabushiki Kaisha, Tokyo, Japan

[21] Appl. No.: 347,397

[22] Filed: May 4, 1989

[30] Foreign Application Priority Data

May 10, 1988 [JP] Japan ............................ 63-113083
Jul. 18, 1988 [JP] Japan ............................ 63-180022

[51] Int. Cl.⁵ .......................................... G01B 9/02
[52] U.S. Cl. .............................. 356/356; 250/237 G
[58] Field of Search .......................... 356/356, 374; 250/237 G

[56] References Cited

U.S. PATENT DOCUMENTS 4,395,630  7/1983  Ramsden et al. ............. 250/237 G

Primary Examiner—Davis L. Willis
Assistant Examiner—Matthew W. Koren
Attorney, Agent, or Firm—Fitzpatrick, Cella, Harper & Scinto

[57] ABSTRACT

A displacement measuring apparatus comprises a scale relatively displaced to an irradiating beam, a reading head to read the scale by the irradiating beam, and control device to control the apparatus for avoiding substantially the leakage of the irradiating beam out of the apparatus in response to the positional error of the scale and the irradiating beam.

31 Claims, 5 Drawing Sheets

DISPLACEMENT MEASURING APPARATUS

BACKGROUND OF THE INVENTION

1. Field of the Invention

The present invention relates to a displacement measuring apparatus by using a radiation beam, such as an optical linear encoder or an optical rotary encoder.

2. Related Background Art

As shown in U.S. Pat. No. 3,726,595, U.S. Pat. No. 4,629,886 or U.S. Pat. No. 4,676,645, a measuring apparatus of the displacement of a body to be detected to which a linear scale is attached has been known, where a laser light is impinged onto the linear scale and a reflected light from the scale is detected by a photo-detector.

In the displacement measuring apparatus disclosed in the above-mentioned U.S. Patents, the scale is formed with diffraction gratings, an interference fringe is formed with a diffraction light emitted from the scale onto which a laser light is radiated so as to detect displacement of a body to be detected or the scale on the basis of a signal obtained by the photo-electric conversion of the interference fringe. Thus the apparatus is capable of obtaining a very high resolving power measurement. However, the laser light may leak from the apparatus outside when the linear scale moves more than an effective length (i.e., the length of the diffraction gratings accompanied with a movement of the body to be detected, or the scale inclines more than a certain angle against a displacement direction of the scale, or the scale deviates to an orthogonal direction with respect to the displacement direction.

SUMMARY OF THE INVENTION

The present invention is based on a recognition of the above-mentioned defect.

The object of the invention is to provide a displacement measuring apparatus which is possible to prevent a leakage of a radiation beam such as laser light.

In order to achieve the object, an aspect of the present invention provides a measuring apparatus of a relative displacement between a radiation beam and a scale crossing a beam path of the radiation beam, and comprises an irradiation means irradiating the radiation beam along the beam path, a conversion means receiving the radiation beam modulated by a pattern formed on the scale and converting it into a signal which corresponds to the displacement, discrimination means discriminating whether there is the pattern in the beam path or not, and control means controlling the irradiation of the radiation beam responding to a signal from the discrimination means.

In order to achieve the object, another aspect of the present invention provides a measuring apparatus of a relative displacement between a radiation beam and a scale crossing a beam path of the radiation beam, and comprises irradiation means irradiating the radiation beam along the beam path, conversion means receiving the radiation beam modulated by a pattern formed on the scale and converting it into a signal which corresponds to the displacement, and a position error detection system outputting a signal which corresponds to a position error between the radiation path and the pattern in order to modify the position relation between them.

The preferred embodiment of the invention uses a high output and compact semiconductor laser as a light source and reads the scale by a laser light which is a radiation beam from the semiconductor laser. According to the present invention, the laser light is accurately positioned with respect to a pattern of the scale and a comparatively strong laser light is not irradiated outside the pattern such that an undesired laser light is prevented from leaking outside the apparatus.

Various features and concrete aspects are described in the following embodiments.

BRIEF DESCRIPTIONS OF THE DRAWINGS

Preferred embodiments will be fully described with respect to the drawings in the following descriptions, wherein.

DETAILED DESCRIPTION OF THE PREFERRED EMBODIMENTS

Figure 1:
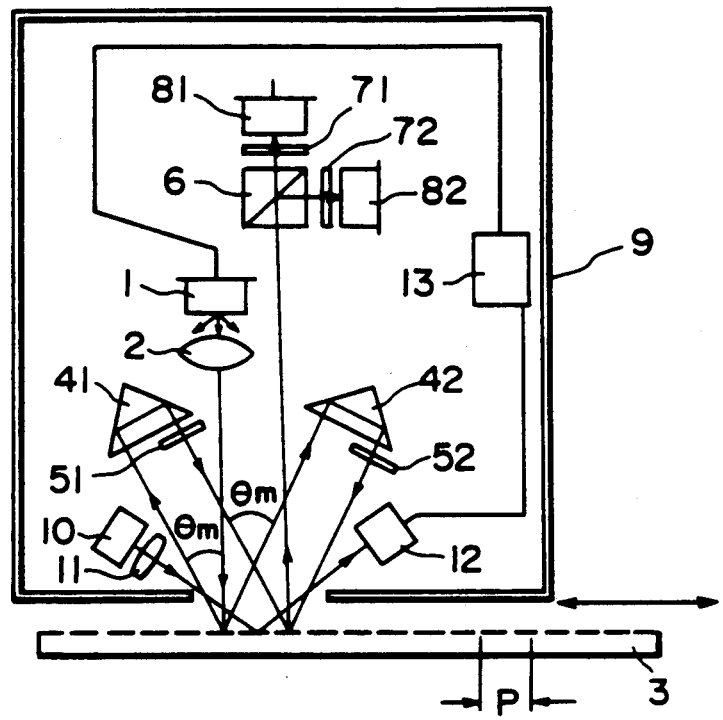
FIG. 1 is an outline view of an embodiment of the present invention.

FIG. 1 is an outline view of the first embodiment of a linear encoder utilizing the present invention.

In this figure, the reference numeral 1 denotes a semiconductor laser, 2 denotes a collimator lens and 3 denotes a scale attached to a moving body not shown, the scale comprising a diffraction gratings (a grating pattern) having a constant grating pitch and a reflecting part which is fully described below and moving at a speed V in a direction shown by the arrow. The reference numerals 51 and 52 are ¼ wavelength plates, respectively, and 41 and 42 are Daph prisms or corner cube reflecting mirrors for preventing axis errors of a rediffraction light against a photo-receiving system which is caused by an inclination of the diffraction grating 3 or a deviation of the oscillation wavelength of the laser 1. The reference numeral 6 denotes a beam splitter and 71 and 72 denote a polarizing plate, the polarizing axis thereof, respectively, are orthogonal to each other. Moreover the axis of the plate 71, 72 makes an angle of 45° to the polarizing axis of ¼ wavelength plates 51 and 52. The reference numerals 81 and 82 denote a photo-receiving elements of a photo-receiving system. The reference numeral 9 denotes a case and 10 denotes a light emitting element which emits a harmless light to a human body, for example an LED. The reference numeral 11 denotes a condensing lens and 12 denotes a photo-receiving element. The reference numeral 13 denotes a control means which controls a driving of a laser 1 by oscillating or stopping the laser 1 in response to an output signal from the photo-receiving element 12.

In the present embodiment, a photo-emitting element 10, a condensing lens 11 and a photo-receiving element 12 constitute a part of a detection means.

In FIG. 1, a light flux from a laser 1 becomes a substantially parallel flux by a collimator lens 2, proceeds along a given path and is incident upon a diffraction grating 3. Positive and negative mth-order diffraction light reflected and diffracted by the diffracting grating 3 are reflected by a corner cube reflecting mirrors 41 and 42, respectively, via a ¼ wavelength plates 51 and 52, and are reincident upon a diffraction grating 3 and again reflected and diffracted into a positive and negative mth-order diffraction light, respectively, and become overlapped and are divided into two fluxes by a beam splitter 6 and are incident upon photo-receiving elements 81 and 82 via a diffraction plates 71 and 72. The interference flux incident upon the photo-receiving elements 81, 82, respectively, have a phase difference of 90° to each other by a combination of ¼ wavelength plates 51 and 52, and diffraction plates 71 and 72, the phase difference being used to discriminate a moving direction of the diffraction grating 3. Moreover, the interference light (interference fringe, received by photo-receiving elements 81 and 82 are photo-electrically converted in order to find a moving amount of the grating 3.

In a linear encoder of FIG. 1, the light flux is reincident upon a diffraction grating 3 by a reflection means such as a Dach prism or a corner cube reflection mirror. Due to this fact, even when the wavelength of the light from the laser 1 changes due to, for example, a variation of the ambient temperature and a diffraction angle of the diffraction light from the gratins 3, the light is reincident upon the grating 3 at the same angle as the first incidence, the two rediffracted lights overlap necessarily and maintain good the S/N ratio of the output signals from the photo-receiving elements 81 and 82.

Figure 2:
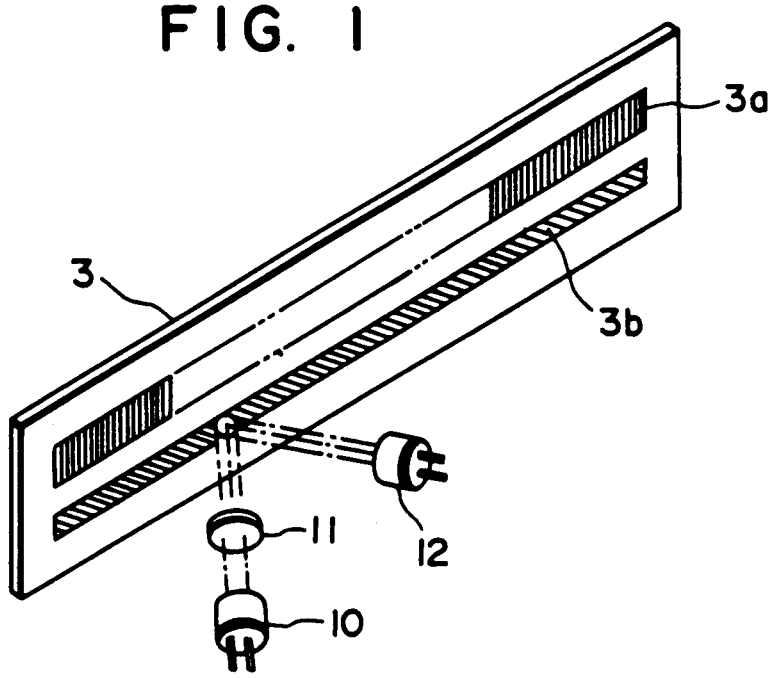
FIG. 2 is a partially enlarged drawing of the apparatus shown in FIG. 1.

FIG. 2 is a partially enlarged drawing for explaining the relation between the scale 3 and detection means comprising a photo-emitting element 10, a condensing lens 11 and a photo-receiving element 12.

In FIG. 2, the reference numeral 3a denotes a diffraction grating provided on the scale 3. The reference numeral 3b denotes a reflection part which is provided along the diffraction grating 3a (the displacement direction of the scale 3). The length in the direction of the diffraction grating 3a and the reflection part 3b are equal to each other and the position of the ends thereof are substantially the same. The condensing lens 11, the photo-receiving element 12 and the reflection part 3b on the scale 3 are part of a safety mechanism of the present apparatus.

The photo-emitting element 10, the condensing lens 11 and the photo-receiving element 12 are in a case not shown.

In this embodiment, the light flux from the photo-emitting element 10 is incident via the condensing lens 11 to a position relatively near to the light path of the laser light of the reflection part 3b, and the reflecting light from the reflection part 3b is received by the photo-receiving element 12.

In such a structure as explained, when the light path of the laser beam and diffraction grating (pattern) of the scale 3 are not in a predetermined positional relationship, and there is no reflected light flux impinged on the photo-receiving element 12 or the light amount received by the photo receiving element does not reach to a preset constant value, it is assumed that there is no diffraction grating 3a of the scale 3 in the light path of the laser beam, for example, the driving of the laser 1 is stopped for preventing the oscillation of the laser 1 by the control means 13 or the exit of the laser beam outside of the case 9 may be prevented by a shutter mechanism set in the light path of the laser beam. By such arrangement, it is possible to prevent a bad effect to the human being by the emission of the laser flux outside of the case.

For making such control, as shown in FIG. 1, photo receiving element 12 and the control means 13 and the laser 1 (driving circuit) are connected by signal lines. From the photo receiving element 12, a signal corresponding to the received light amount is output and this signal is input to the control means 13 through signal lines, and at the control means 13, the signal and a predetermined reference level are compared. And when the level of the signal reaches at this reference level, the first signal is input from the control means 13 into the laser 1 and when the level of the signal does not reach the reference level, the second signal is input from the control means 13 into the laser 1. Said first signal drives the laser 1 to radiate the laser beam having necessary and predetermined strength for the measurement. And the second signal is to stop or prevent the drive of the laser 1, or to reduce the strength of the laser beam from the laser 1 to a value having no problem or to radiate a laser beam having a small strength.

The detecting means (10, 11, 12) of the present embodiment is actuated from a time before the start of the measurement until the completion of the measurement. Before the measurement starts, with the aid of the detecting means (10, 11, 12), whether or not the pattern of the diffraction grid 3a of the scale 3 exists in the light path of the laser beam is detected, and when no existence is detected, the position of the scale 3 is adjusted by a not-shown regulating means so as to let the diffraction grid 3a come into the light path of the laser beam. In this case it is also possible to adjust by moving the case 9 instead of moving the scale 3. On the other hand, when the existence of the pattern of the diffraction grid 3a in the light path of the laser beam is detected, the first signal is input into the laser 1 from the control means 13 to radiate the laser beam from the laser 1 to start the measurement.

During the measurement, the detecting means (10, 11, 12) always detects the existence or non-existence of the pattern of the diffraction grid 3a of the scale 3 in the light path of the laser beam, when the non-existence of the pattern is detected, the second signal is input into the laser 1 from the control means 13 to stop the drive of the laser 1 or to weakening the strength of the laser beam. And after said adjustment is processed the measurement operation is restarted.

Upon completion of the measurement, and after the drive of the laser 1 is stopped, the operation of the detecting means (10, 11, 12) is stopped (irradiation of the photo emitting element 10 is stopped).

Figure 3:
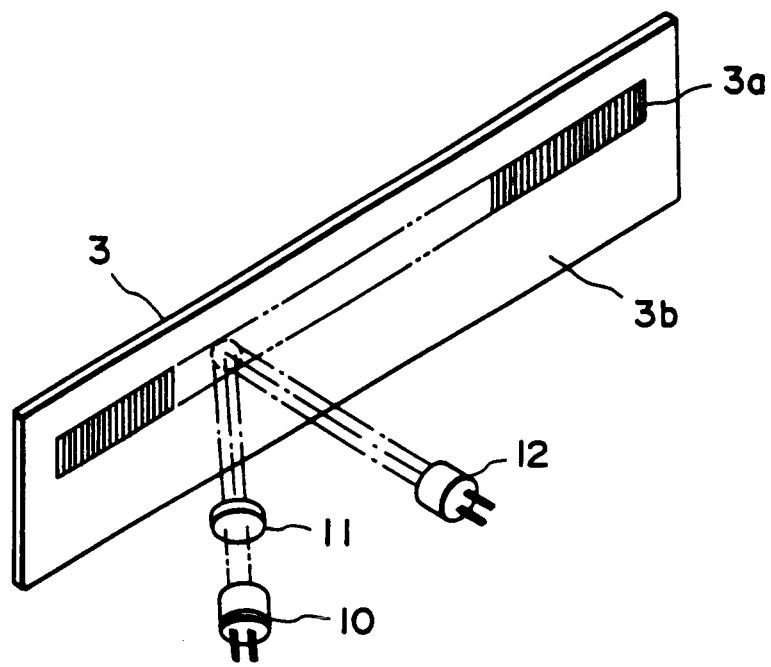
FIG. 3 is a partially enlarged drawings of a modification of the apparatus shown in FIG. 1.

FIG. 3 is partially enlarged drawing showing the modification of the apparatus shown in FIGS. 1 and 2. In this embodiment, light flux from the photo emitting element 10 is incident on the diffraction grating 3a on the scale 3, and the positive reflecting light from the diffraction grating 3a or diffracting light having a predetermined order is received by the photo receiving element 12.

In this embodiment, instead of providing the reflection portion 3b at the peripheral part of the diffraction grating 3a as shown in FIG. 2, the reflecting light from the diffraction grating 3a on the scale 3 is utilized so as to simplify the whole apparatus.

Figure 4:
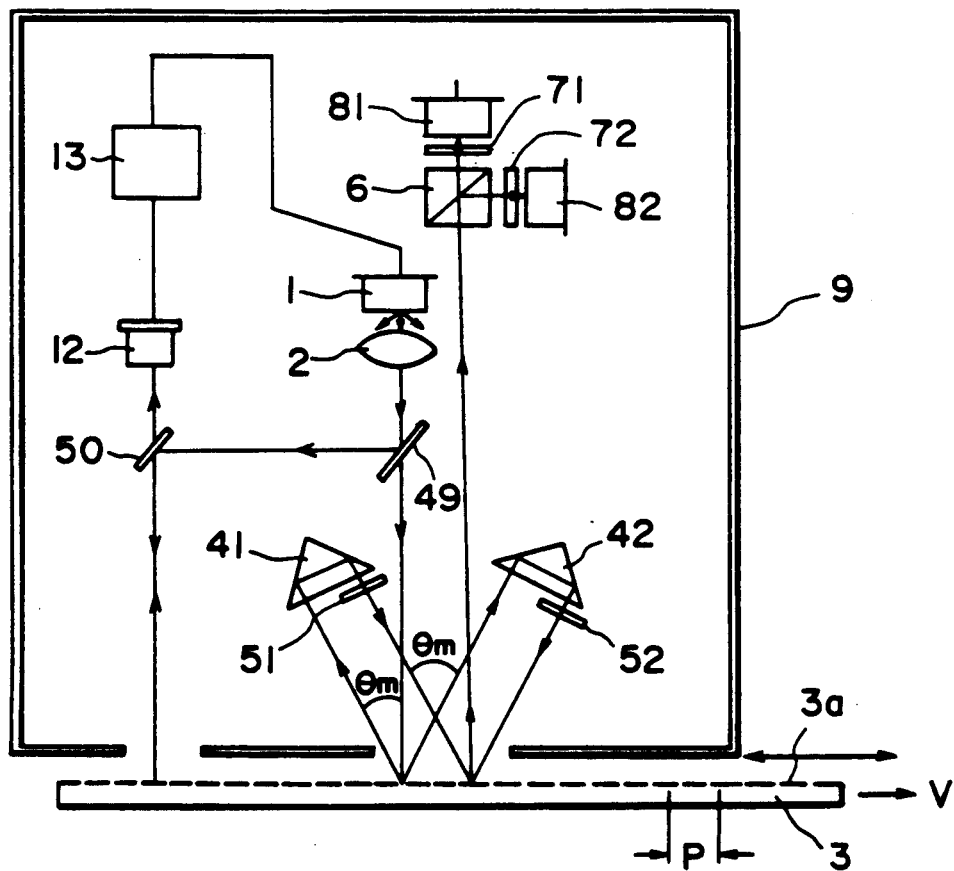
FIG. 4 shows an outline of the second embodiment of the invention.

FIG. 4 shows an outline of the second embodiment of this invention. In FIG. 4, the same reference numerals are assigned to the same members as these shown in FIG. 1 and it is apparent that in the embodiment shown in FIG. 4 and that shown in FIG. 1, the system to measure the displacement of scale 3 is the same.

In this embodiment, the light flux from the laser 1 passing through the collimator lens 2 is divided into two fluxes by the beam splitter 49 having more transmitted light than the reflecting light and reflecting the light of less intensity, which will not give a bad effect to a human being, and the reflected light in said two fluxes is rereflected by the beam splitter 50 to guide it onto the diffraction grating 3a on the scale 3. And the reflected light flux from said diffraction grid 3a on the scale 3 or from the reflecting member 3b as shown in FIG. 2 is transmitted through the beam splitter 50 to detect it by the photo-receiving element 12.

And by utilizing the output signal from the photo receiving element 12, as similar to the device of FIG. 1, the light flux from the laser 1 will not emit outside of the case of the encoder.

In this embodiment, instead of providing a new photo emitting element, a slight light flux from the laser 1 for the measurement is utilized for simplifying the whole apparatus.

Figure 5:
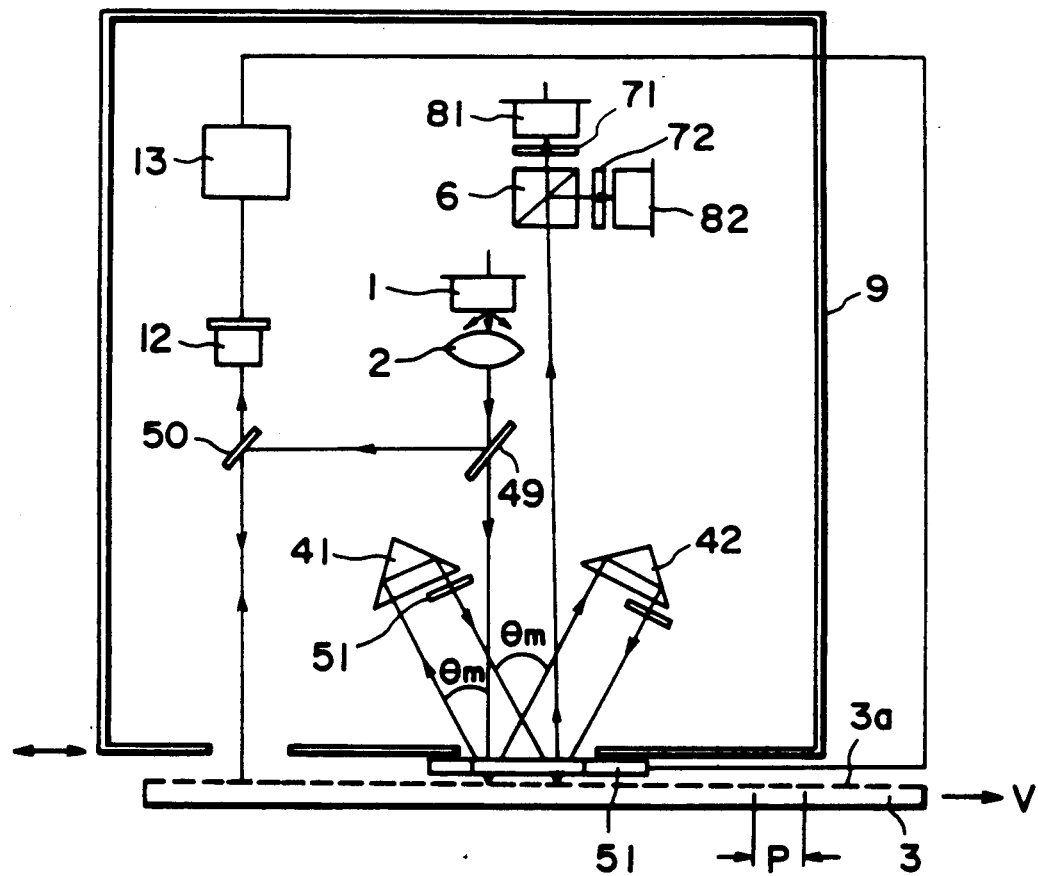
FIG. 5 shows an outline of the third embodiment of the invention.

FIG. 5 shows an outline of the third embodiment of this invention. In this embodiment, through the photo receiving element 12 and the control means 13, the shutter member 51 provided in the light path of the laser beam and connected to the control means 13 by signal line is controlled, which is different from the second embodiment shown in FIG. 4, where the drive of the laser 1 is controlled through the photo receiving element 12 and the control means 13. In other words in FIG. 5, the shutter member 51 is provided at a portion of the case 9, and where the scale 3 is not located at a predetermined position, i.e., the diffraction grating of the scale 3 is not in the light path of the laser beam, the shutter member 51 is closed by the control means 13 in response to a signal from the photo receiving element 12, so as to prevent the light flux from the laser 1 from exiting out of the case.

In the above embodiments, the explanation is made referring to a linear encoder, it is possible to adopt it to a rotary encoder by providing reflecting part 3b in circular shape at the periphery of the diffraction grating or slit etc. arranged radially.

According to the above explained embodiments, the detecting means detects whether or not the light path of the laser beam and the pattern of the scale are located with a predetermined positional relation, and on the basis of the output signal from the detecting means, the oscillating state of the laser is controlled by the control means or the laser beam is interrupted by the shutter means to avoid the emission of the laser beam outside of the apparatus so as to protect the human being from a bad effect.

Further, detecting means can be suitably constructed, for example, illuminating region of the light flux from the photo emitting element 10 in FIG. 1 is adjusted so as to predict the non-existence of the pattern of the scale from the light path of the laser beam before the pattern is actually escape from the light path. By such an arrangement, the safety of the apparatus is further improved.

Figure 6:
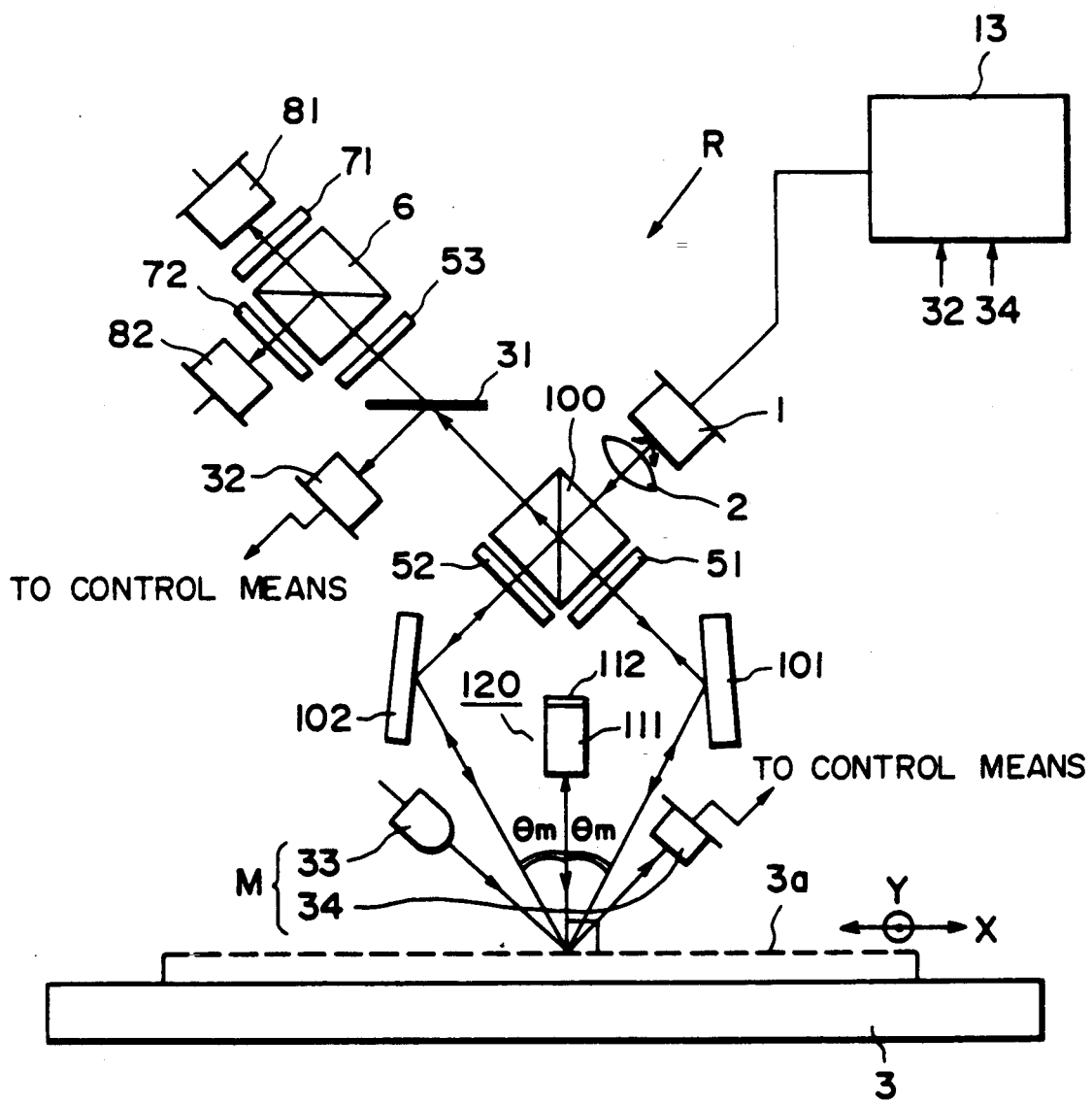
FIG. 6 shows an outline of the fourth embodiment of the invention.

FIG. 6 shows an outline of the fourth embodiment, in which the laser beam having coherency coming from semiconductor laser 1 is made substantially parallel light flux by collimator lens 2 to incident into polarized beam splitter 100 to divide into two light fluxes of P polarized transmitting light flux and S polarized reflecting light flux. The mounting position of the laser 1 is adjusted such that the polarizing direction of the emitting flux of the laser 1 makes an angle of 45 degrees against the polarizing direction of the polarized divisional surface of the polarized beam splitter 100. Thus the ratio of the intensities of the transmitting light flux and the reflected light flux from the splitter 100 will be about 1:1.

And the reflected light flux and the transmitting light flux from the polarizing beam splitter 100 are made circular polarizing through ¼ wavelength plate 51, 52, respectively, and they are incident into the diffraction grating 3a of the optical scale 3 through the respective predetermined light path. It is noted here that each light flux is incident obliquely so that the m-order diffraction light from the diffraction grating 3a is reflectingly diffracted substantially orthogonal from the diffraction grating 3a.

Taking grating pitch of the diffraction grating 3a is P, wavelength of the laser beam is λ, and assuming m as an integer number and the incident angle to the diffraction grating 3a of the laser flux is θm, then $$\theta m = \sin^{-1}(m\ \lambda/P)\ (m = +1, +2, \ldots) \tag{1}$$

The diffraction grating 3a is formed on a movable scale 3 as amplitude type or phase type, such as relief pattern, diffraction grating. And as the scale 3 moves in X direction, the diffraction grating 3a displaces in X direction.

The two m-order reflecting diffraction light emitted substantially orthogonal from the diffraction grating 3a, incident into refractive index distribution type lens 111. Near to the focal plane of the lens 111, the reflecting film 112 is provided, and the incident light flux reflects at the reflecting film 112 and returns through the previous light path to be emitted from the lens 111 to reincident into the diffraction grating 3a.

The m-order reflecting diffraction light rediffracted at the diffraction grating 3a returns through the previous light path and are reflected by the reflecting mirrors 101, 102 and transmitted through the ¼ wavelength plates 51, 52 to reincident into polarizing beam splitter 100. Since the rediffracted light has reciprocatingly moved in ¼ wavelength plates 51, 52, the light flux (S polarized light) firstly reflected at the beam splitter 100 will have, when it is reincident, 90 degree-different polarizing direction to the beam splitter 100 so that it becomes P-polarizing light and it will transmit through the beam splitter 100. On the other hand, the light flux (P-polarized light) firstly transmitted to the beam splitter 100 will be S-polarized light when it is reincident so that it will be reflected.

Thus two rediffracted lights are overlapped at the polarizing beam splitter 100 and they are made reversely rotating circular polarized lights after passing beam splitter 31 and with the aid of ¼ wavelength plate 53, and then divided into two light fluxes by the beam splitter 6 and after passing the polarizing plates 71, 72 they are incident to photo receiving elements 81, 82 as linear polarizing light.

In the equation (1), angle $\theta m$ can be in a region where the diffraction light is incident into reflecting system 120 and reincident into the diffraction grating 3a.

In this embodiment, the phase of the m-order diffraction light changes by $2m\pi$ as the diffraction grating 3a moves 1 pitch. Thus since the photo receiving elements 81 and 82 receive interference light formed by the light fluxes which have received positive and negative m-order diffractions in two times, when the diffraction grating 3a moves 1 pitch, 4m number sinusoidal wave signals are obtained.

For example, assuming the pitch of the diffraction grating 3a is 3.2 μm, and 1st Order ($m=\pm 1$) reflecting diffraction light is used, and when the diffraction grating moves 3.2 μm, four sinusoidal wave signals are obtained from the photo receiving elements 81 and 82. As the resolving power per one sinusoidal wave, $\frac{1}{4}$ of the pitch of the diffraction grating 3a, i.e., 3.2/4=0.8 μm, is obtained.

Further, by the combination of $\frac{1}{4}$ wavelength plates 51, 52 and 53 with polarizing plates 71, 72, 90 degree phase difference is obtained between output signals from the photo receiving elements 81 and 82, and it is possible to judge the moving direction of the diffraction grating.

It is added that if only the moving amount is to be measured, the photo receiving element may be one, and in this case $\frac{1}{4}$ wavelength plate 53 and the beam splitter 6 are unnecessary.

In FIG. 6, reading head for measuring the displacement of the diffraction grid 3a (the displacement of the scale 3) is shown by R, and the reading head R and scale 3 constitute displacement measuring device.

Figure 7:
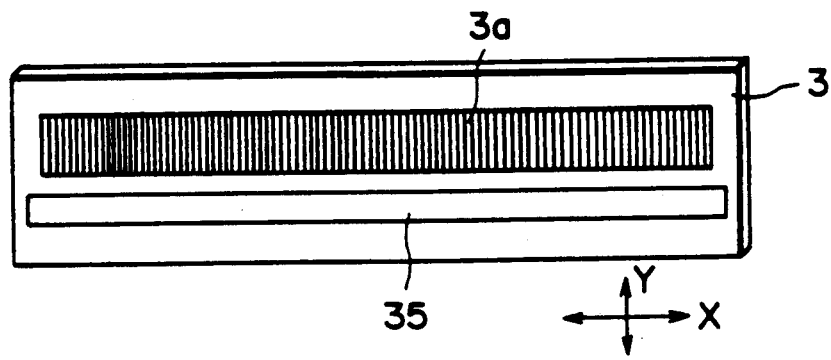
FIG. 7 is a plan view of a scale used in the embodiment shown in FIG. 6.

In this embodiment, on the base plate 200, the diffraction grating 3a which is a scale and a predetermined reflecting part are formed, as shown in FIG. 7.

In FIG. 7, the reference numeral 35 denotes the reflecting part, and the linear pattern extending along X direction, which is grating array direction of the diffraction grating 3a, is formed near to the diffraction grating on the reflecting part 35, which is provided for detecting the positional relation of the incident position of the laser beam to the scale 3 (light path for the laser beam) and the diffraction grating 3a. The reflecting part 35 cooperates with the reflecting part detection system M, which is constituted by photo emitting element 33 and the photo receiving element 34, to monitor whether or not the scale 3 locates at the position where the laser beam will incident into the diffraction grating 3a. The photo emitting element 33 in FIG. 6 is different from the laser and it is an element to irradiate the light having no bad effect to the human being, and in this embodiment, an LED is used.

The light from the photo emitting element 33 irradiates the reflecting part 35, and the reflected light from the part 35 is received by the photo receiving element 34.

The reflecting part detection system M constituted by the photo emitting element 33 and the photo receiving element 34, and the displacement measuring optical system shown in FIG. 6 are contained in the same reading head R.

It is noted here that the irradiating position of the laser beam, the irradiating position of the light from the photo emitting element 33, and the positions of the diffraction grating 3a and the reflecting part 35 are determined such that the intensity of the reflecting light received by the photo receiving element 34 in case that the irradiating position of the laser beam deviates from the grating 3a or just prior to the deviation, becomes less than a predetermined threshold value.

Consequently, whether or not the laser beam irradiates the diffraction grating 3a is detected by the output signal of the detection system constituted by the elements 33 and 34, i.e., photo electric converting signal by the photo receiving element 34. Thus the change of the intensity of the signal from the photo receiving element 34 is monitored and when this intensity becomes less than the threshold value, similar to the above explained embodiment, the drive of the laser 1 is stopped and the leakage of the laser beam from the reading head R to the outside of the apparatus can be avoided.

Now turning back to FIG. 6. The beam splitter 31 reflects a portion of the light flux from the diffraction beam splitter 100, and this light portion is directed to the photo receiving element 32. The light flux from the splitter 100 is a light where the diffraction light rays having orthogonal diffraction directions, respectively, are overlapped, there is no change in intensity when the diffraction grating 3a moves in X-direction. Thus, the photo receiving element 32, with no relation with the movement the grating 3a, can solely monitor the intensity of the diffraction light, so that the change of intensity of the diffraction grating 3a depends on the change of the output of the laser 1, and relative positional relation between the grating 3a and the incident light beam except in the X direction can be detected. The signal is processed by, for example, the circuit shown in FIGS. 8A and 8B in the control means 13. In FIGS. 8A and 8B, 141 and 142 are amplifiers, 143 and 144 are comparators, 145, 146, 149 and 150 are resistors, 147 and 148 are reference voltage sources, and 151 and 152 are display photo emitting elements, for example, LEDs. Reference numerals 153 and 154 are terminals to input into not-shown subsequent control circuit, the signal of "HIGH" or "LOW" from the comparators 143 and 144. As shown in the drawing, the signal from the comparator 144 is used to control the driving circuit of the semiconductor laser 1.

The signal current corresponding to the light intensity produced at the photo receiving elements 32 and 34 is converted to signal voltage corresponding to light intensity by the amplifiers 141 and 142 and resistors 145 and 146. These signal voltages are compared in the comparators 143 and 144 with the predetermined reference voltages (threshold values) 147 and 148 and when the intensity exceeds a predetermined value, the output terminals 153 and 154 are made LOW voltages so as to turn on LEDs 151 and 152. And when the intensity is less than a predetermined value, the output terminals 153 and 154 become HIGH voltages to turn off LED. Thus the intensity of the light received by the photo receiving elements 32 and 34 can be identified. The light flux from the photo receiving element 32 has a large diameter and has no directivity, the change of the light flux incident into the element 34 becomes small when the scale 3 displaces a small amount to Y direction. However, the intensity of laser beam incident to the photo receiving element 32 will greatly change relative to the displacement of the scale 3 to Y direction since the beam diameter is small and the beam is parallel, so that the suitable range for the incident position of the laser to the scale 3 becomes narrow. Consequently, the intensity of the light beam incident to the photo receiving element 34 is monitored first, and the position of the substrate 200, namely scale 3 comprising by the diffraction grating 3a is roughly adjusted and then the intensity of the light beam to the element 32 is monitored, while the position of the diffraction grating 3a is finely adjusted. Thus the adjustment is very easy and the scale 3, namely, grating 3a is easily located at a most suitable position so that the diffraction grating 3a is suitably located in the light path of the laser beam to let the laser beam incident on the grating 3a.

As explained before, when the intensity of the light beam incident on the photo receiving element 34 does not reach to a predetermined value the operation of the laser 1 is stopped, and when the intensity reaches to a predetermined value, the laser 1 is driven, then even when the power source is carelessly put in under the state that the grating 3a does not locate at the incident position of the laser beam or the grating 3a moves over its effective distance so that the grating 3a comes out of the light path of the laser beam during the measurement of displacement, there is no possibility of the emission of the laser beam, which is most safety.

This control is proceeded by putting the output of the terminal 154 on the driving circuit of the laser 1 and when the output of the terminal 154 is a HIGH voltage, the emission of the laser 1 is stopped, and when the terminal 154 is LOW voltage, the laser 1 is driven. Thus when the grating 3a is out of the incident position of the laser beam, there is no possibility of emitting the laser beam from the laser 1.

Alternatively the change of the intensity can be detected by directly monitoring the output voltage of the amplifiers 141 and 142.

The operation explained above can be summarized in the following table.

TABLE I

| The position of the diffraction grating 3a to the laser beam | Laser 1 | LED 152 | LED 151 |
|---|---|---|---|
| Largely deviated from the range | OFF | Light OFF | Light OFF |
| Comes into a certain range | ON | Light ON | Light OFF |
| In most suitable position | ON | Light ON | Light ON |
| Light intensity incident to the element 32 is lowered | ON | Light ON | Light OFF |

Figures 9A, 9B:
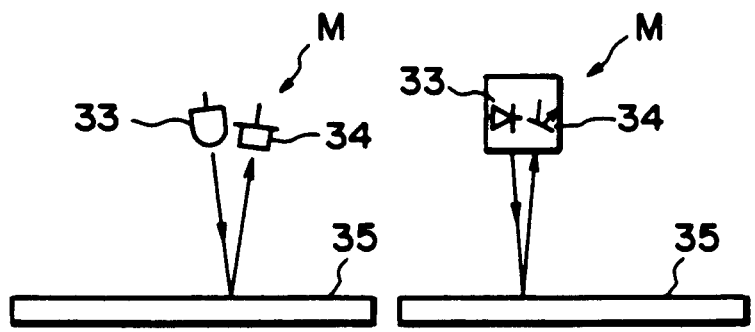
FIG. 9A and 9B are schematic views of a variation of a detection system for monitoring a position of a scale.

There is no specific limitation to the incident angle of the light flux irradiated to the reflecting portion 35 of the scale 3 from the photo emitting element 33, and it may be all right to incident from substantially orthogonal direction as shown in FIG. 9A. Further, the direction system may be the one as shown in FIG. 9B, where photo emitting element and photo receiving element are put into a package as a pair. The photo emitting element 33 may be instead of LED, any one which emits a highly safety irradiating beam, and the photo receiving element 34 is not restricted to photo-diode or photo-transistor etc.

Figure 8A:
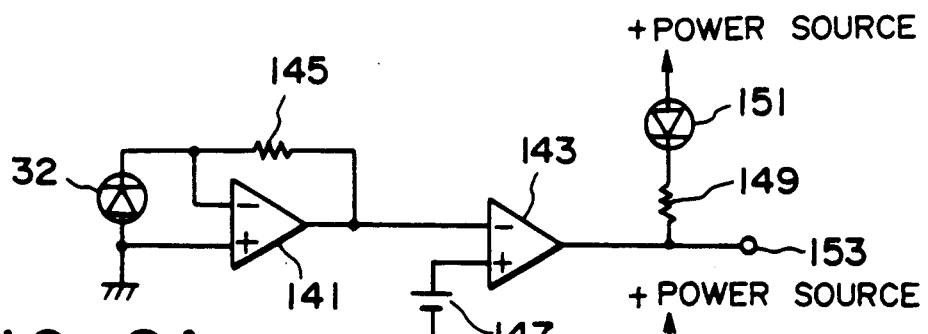
FIG. 8A and 8B show examples of a processing circuit used in the embodiment shown in FIG. 6.
Figure 8B:
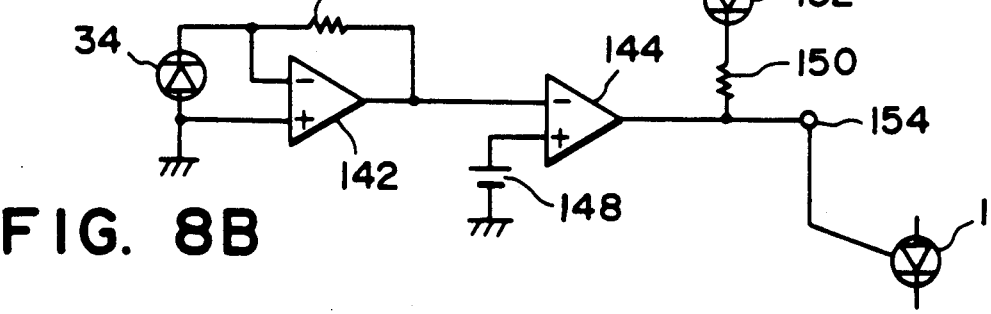

Further, the display of the two signals obtained by the circuit shown in FIGS. 8A and 8B can be made by the reading head R of the encoder or in the interface unit to process the signal obtained from the reading head R, however, within the scope of the present invention the display can be made anywhere.

Moreover, in FIG. 6, the arrangement of the beam splitter 31 is not limited to the position shown in FIG. 6 and it may be possible to locate it between $\frac{1}{4}$ wavelength plate 53 and the beam splitter 6.

As explained in the foregoing, a safety displacement measuring apparatus having no leakage of the laser beam from the reading head to the outside of the apparatus can be obtained by providing a detecting means to detect the positional relation between the incident position of the laser beam to the movable substrate (light path of the laser beam) and the diffraction grating (optical scale) formed on the movable substrate, and regulating the irradiation of the laser beam on the basis of the output signal from the detection means.

Further, in some of the embodiments mentioned in the foregoing, the optical means is used as a detecting means, but, magnetic sensor or mechanical sensor etc., which can detect the shift of the incident position of the laser beam relative to the pattern of the scale can be used.

In some of the embodiments, displacement measuring apparatus to read the scale forming diffraction grating, the present invention is not limited to such type. For example, the device for reading with a laser beam the well-known optical scale forming the grating pattern may alternately arrange the light transmission portions and the light interrupting portions, or the device using a radiation beam other than laser beam can also be used.

In any type, the optical system to read the scale can be freely set. Thus various kinds of displacement measuring devices may be provided without departing from the scope of the present invention.

We claim:
1. A displacement measuring apparatus comprising:
   a scale relatively displaced to an irradiating beam;
   a reading head to read said scale by the irradiating beam; and
   control means to control the apparatus for avoiding substantially the leakage of the irradiating beam out of the apparatus in response to the positional error of the scale and the irradiating beam,
   wherein said control means comprises modulating means to modulate the intensity of said irradiating beam.
2. A displacement measuring device according to claim 1, wherein said irradiating beam is a laser beam.
3. A displacement measuring apparatus comprising:
   a scale relatively displaced to an irradiating beam;
   a reading head to read said scale by the irradiating beam; and
   control means to control the apparatus for avoiding substantially the leakage of the irradiating beam out of the apparatus in response to the positional error of the scale and the irradiating beam,
   wherein said control means comprises a shutter mechanism to interrupt the beam path of said irradiating beam.
4. A displacement measuring apparatus according to claim 3, wherein said irradiating beam is a laser beam.
5. A displacement measuring apparatus for measuring a relative displacement of an irradiating beam and a scale crossing the beam path of the irradiating beam comprising:
   irradiating means to irradiate said irradiating beam along a beam path;
   converting means to receive the irradiating beam modulated by the pattern of said scale and convert it into a signal corresponding to said displacement;

discriminating means to discriminate whether or not said pattern of the scale locates in said beam path; and control means to control the irradiation of the irradiating beam in response to a signal from said discriminating means, wherein said discriminating means outputs a first signal when said pattern locates in said beam path and outputs a second signal which is different from said first signal when the pattern is not in the beam path, and wherein said control means actuates said irradiating means in response to said first signal to irradiate the irradiating beam of a predetermined intensity.

6. A displacement measuring apparatus according to claim 5, wherein said irradiating means irradiates laser beam.

7. A displacement measuring apparatus according to claim 6, wherein said irradiating means comprises a semiconductor laser supplying said laser beam.

8. A displacement measuring apparatus according to claim 5, wherein said control means actuates said irradiating means in response to said second signal to weaken the intensity of the irradiating beam less than said predetermined intensity.

9. A displacement measuring apparatus according to claim 5, wherein said control means actuates said irradiating means in response to said second signal to stop the irradiation of the irradiating beam.

10. A displacement measuring apparatus according to claim 5, wherein said control means actuates said irradiating means in response to said second signal to interrupt the irradiating beam intermediate of said beam path.

11. A displacement measuring apparatus for measuring a relative displacement of an irradiating beam and a scale crossing the beam path of the irradiating beam comprising:

irradiating means to receive the irradiating beam modulated by the pattern formed on the scale and convert it into a signal corresponding to said displacement; and means to output a signal corresponding to a displacement error between said beam path and the pattern for correcting the positional relation of the beam path and the pattern, wherein said apparatus further comprises control means to control the irradiation of the irradiation beam in response to a signal from said output means.

12. A displacement measuring apparatus according to claim 11, wherein said irradiating means irradiates laser beam.

13. A displacement measuring apparatus according to claim 12, wherein said irradiating means comprises a semiconductor laser for supplying said laser beam.

14. A displacement measuring apparatus according to claim 12, wherein said output means comprises irradiating means to irradiate a part of said laser beam along a beam path different from said beam path and photoelectric converting means to convert the light from said pattern irradiated by said part of the beam.

15. A displacement measuring apparatus according to claim 11, wherein said output means comprises a light source to direct the light beam to the pattern for detecting the positional error of said scale and photo-electric converting means to convert the light from said pattern.

16. A displacement measuring apparatus according to claim 11, wherein said control means will not irradiate said irradiation beam when said pattern is not in said beam path.

17. A displacement measuring apparatus according to claim 11, wherein said control means will irradiate the irradiation beam only when said pattern is in the beam path.

18. A displacement measuring apparatus comprising:
a laser;
a scale relatively moving to a laser beam from said laser;
photo-electric converting means to convert the laser beam modulated by a grating pattern of said scale into a signal corresponding to the displacement and to output the signal; and
detecting means to detect positional error of the grating pattern and the beam path of the laser beam,
wherein said apparatus further comprises control means to control the drive of said laser in response to said signal from said detecting means.

19. A displacement measuring apparatus according to claim 18, wherein said apparatus further comprising:
means to display an information relating to said positional error in response to the signal from said detecting means.

20. A displacement measuring apparatus according to claim 19, wherein said display means comprises a photo emitting element emitting light in response to said signal.

21. A displacement measuring apparatus according to claim 18, wherein said control means irradiates a laser beam of a predetermined intensity from said laser when said detecting means does not detect said positional error.

22. A displacement measuring apparatus according to claim 21, wherein said control means irradiates from said laser a laser beam having a smaller intensity than said predetermined intensity when the detecting means detects said positional error.

23. A displacement measuring apparatus according to claim 18, wherein said control means stops the drive of said laser when said detecting means detects said positional error.

24. A displacement measuring apparatus according to claim 18, wherein said apparatus further comprising:
a shutter structure provided in said beam path, and control means to control closing-and-opening of said shutter structure in response to a signal from said detecting means, the control means controlling said shutter structure to close when said detecting means detects said positional error.

25. A displacement measuring apparatus according to claim 18, wherein said apparatus further comprising adjusting means to adjust said apparatus for substantially preventing the leakage of said laser beam out of said apparatus in response to a signal from said detecting means when said detecting means detects said positional error.

26. A displacement measuring apparatus comprising:
a laser;
a scale relatively displacing to a laser beam from said laser, the scale having a diffraction grating pattern diffracting said laser beam;
photo-electric converting means to photo-electrically converting an interference light formed by diffraction beams from said scale to output a signal corresponding to said displacement;

detecting means to detect a positional error of said diffraction grating pattern and the beam path of said laser beam; and modulating means to modulate said laser beam in response to a signal from said detecting means.

27. A displacement measuring apparatus according to claim 26, wherein said detecting means comprises a light source; a positional error detecting mark provided on said scale neighboring to said pattern; and a photo receiving element to receive a light from said mark illuminated by a light from said light source to output a signal corresponding to said positional error.

28. A displacement measuring apparatus according to claim 27, wherein said detecting means further comprises a beam splitter to take out a part of diffraction beam from said scale; and a second photo receiving element receiving said part of diffraction beam to output a second signal in response to said positional error.

29. A displacement measuring apparatus according to claim 26, wherein said detecting means comprises an optical system to take out a part of said laser beam and to direct it to said diffraction grating; and a photo receiving element receiving the beam from said diffraction grating illuminated through said optical system and output a signal corresponding to said positional error.

30. A displacement measuring apparatus according to claim 26, wherein said modulating means comprises a shutter structure for interrupting said beam path.

31. A displacement measuring apparatus according to claim 26, wherein said modulating means comprises means to modulate the intensity of said laser beam.

* * * * *

UNITED STATES PATENT AND TRADEMARK OFFICE
CERTIFICATE OF CORRECTION

PATENT NO. : 5,066,130
DATED : November 19, 1991
INVENTOR(S) : MASAAKI TSUKIJI ET AL.

It is certified that error appears in the above-identified patent and that said Letters Patent is hereby corrected as shown below:

COLUMN 1

Line 29, "gratings" should read --gratings)--.

COLUMN 2

Line 19, "drawings" should read --drawing--.
Line 42, "gratings" should read --grating--.
Line 47, "Daph" should read --Dalh--.
Line 54, "a polarizing plate," should read --polarizing plates,--.
Line 55, "axis" should read --axes-- and "are" should be deleted.
Line 56, "plate 71, 72" should read --plates 71, 72-- and "axis" should read --axes--.
Line 59, "a" (first occurrence) should be deleted.

COLUMN 3

Line 9, "a" should be deleted.
Line 10, "a" should be deleted.
Line 16, "a" should be deleted.
Line 24, "82 are" should read --82) is--.
Line 33, "gratins 3," should read --grating 3,--.
Line 67, "photo receiving" should read --photo-receiving--.

UNITED STATES PATENT AND TRADEMARK OFFICE
CERTIFICATE OF CORRECTION

PATENT NO. : 5,066,130

DATED : November 19, 1991

INVENTOR(S) : MASAAKI TSUKIJI ET AL.  Page 2 of 6

It is certified that error appears in the above-identified patent and that said Letters Patent is hereby corrected as shown below:

COLUMN 4

Line 10, "photo" should read --photo- --.
Line 13, "photo receiving" should read --photo-receiving--.
Line 52, "weakening" should read --weaken--.
Line 59, "is" should read --is a--.
Line 65, "photo receiving" should read --photo-receiving--.

COLUMN 5

Line 6, "these" should read --those--.
Line 22, "photo" should read --photo- --.
Line 31, "photo" should read --photo- --.
Line 37, "photo receiving" should read --photo-receiving--.
Line 44, "photo receiving" should read --photo-receiving--.
Line 47, "the" (2nd occurrence) should read --while the--.
Line 67, "is actually escape" should read --actually escapes--.

UNITED STATES PATENT AND TRADEMARK OFFICE
CERTIFICATE OF CORRECTION

PATENT NO. : 5,066,130
DATED : November 19, 1991
INVENTOR(S) : MASAAKI TSUKIJI ET AL.   Page 3 of 6

It is certified that error appears in the above-identified patent and that said Letters Patent is hereby corrected as shown below:

COLUMN 6

```
Line 19, "plate 51," should read --plates 51,--.
Line 27, "is" should read --as--.
Line 39, "light" should read --lights--.
Line 41, "incident" should read --enter--.
Line 47, "into" should read --onto--.
Line 51, "to" should read --to be--.
Line 52, "has" should read --has been--.
Line 53, "in" should read --through--.
Line 66, "divided" should read --are divided--.
```

COLUMN 7

```
Line 1,  "photo receiving" should read
         --photo-receiving--.
Line 8,  "photo receiving" should read
         --photo-receiving--.
Line 11, "in" should be deleted.
Line 16, "and" should be deleted.
Line 18, "photo receiving" should read
         --photo-receiving--.
Line 25, "photo receiving" should read
         --photo-receiving--.
Line 29, "photo receiving" should read
         --photo-receiving--.
Line 49, "photo receiving" should read
         --photo-receiving--.
Line 58, "photo receiving" should read
         --photo-receiving--.
Line 61, "photo receiving" should read
         --photo-receiving--.
```

UNITED STATES PATENT AND TRADEMARK OFFICE
CERTIFICATE OF CORRECTION

PATENT NO. : 5,066,130

DATED : November 19, 1991

INVENTOR(S) : MASAAKI TSUKIJI ET AL.

It is certified that error appears in the above-identified patent and that said Letters Patent is hereby corrected as shown below:

COLUMN 8

Line 2, "photo receiving" should read --photo-receiving--.
Line 10, "photo receiving" should read --photo-receiving--.
Line 11, "photo receiving" should read --photo-receiving--.
Line 20, "photo receiving" should read --photo-receiving--.
Line 23, "there" should read --so there--.
Line 25, "photo receiving" should read --photo-receiving--.
Line 45, "photo receiving" should read --photo-receiving--.
Line 55, "LED." should read --the LEDs.--.
Line 56, "photo" should read --photo- --.
Line 58, "photo receiving" should read --photo-receiving--.
Line 63, "photo receiving" should read --photo-receiving--.
Line 68, "photo receiving" should read --photo-receiving--.

UNITED STATES PATENT AND TRADEMARK OFFICE
CERTIFICATE OF CORRECTION

PATENT NO. : 5,066,130

DATED : November 19, 1991

INVENTOR(S) : MASAAKI TSUKIJI ET AL.   Page 5 of 6

It is certified that error appears in the above-identified patent and that said Letters Patent is hereby corrected as shown below:

COLUMN 9

Line 2, "by" should be deleted.
Line 10, "beam" should read --beam be--.
Line 12, "photo receiving" should read --photo-receiving--.
Line 21, "most safely." should read --safest.--.
Line 52, "to" should read --to be--.
Line 55, "photo receiving" should read --photo-receiving--.
Line 57, "be" should read --be used-- and "LED," should read --the LED,--.
Line 58, "photo receiving" should read --photo-receiving--.

COLUMN 10

Line 21, "to" should read --is used to--.
Line 22, "the" should read --but the--.

UNITED STATES PATENT AND TRADEMARK OFFICE
CERTIFICATE OF CORRECTION

PATENT NO. : 5,066,130

DATED : November 19, 1991

INVENTOR(S) : MASAAKI TSUKIJI ET AL.

It is certified that error appears in the above-identified patent and that said Letters Patent is hereby corrected as shown below:

<u>COLUMN 12</u>

Line 23, "comprising:" should read --comprises:--.
    Line 46, "comprising:" should read --comprises:--.
    Line 54, "comprising" should read --comprises--.

Signed and Sealed this

Tenth Day of May, 1994

Attest:

BRUCE LEHMAN

Attesting Officer     Commissioner of Patents and Trademarks